United States Patent [19]
Bronowocki et al.

[11] Patent Number: 5,591,900
[45] Date of Patent: Jan. 7, 1997

[54] METHOD AND APPARATUS FOR TESTING FLUID PRESSURE IN A SEALED VESSEL

[75] Inventors: Allen J. Bronowocki, Laguna Niguel; Steven P. Kuritz, Los Angeles, both of Calif.; Brian K. Blackburn, Rochester, Mich.; Scott B. Gentry, Romeo, Mich.; Joseph F. Mazur, Washington, Mich.

[73] Assignees: TRW Vehicle Safety Systems Inc.; TRW Inc., both of Lyndhurst, Ohio

[21] Appl. No.: 311,607

[22] Filed: Sep. 23, 1994

Related U.S. Application Data

[63] Continuation-in-part of Ser. No. 986,035, Dec. 4, 1992, Pat. No. 5,351,527.

[51] Int. Cl.⁶ .......................... G01M 3/00; G01F 15/00; B60R 21/16; B60R 21/26
[52] U.S. Cl. .......................... 73/52; 280/736; 280/728.1
[58] Field of Search .......................... 73/52, 702, 706, 73/749, 579, 49.3; 280/728 R, 735, 736, 737, 741

[56] References Cited

U.S. PATENT DOCUMENTS

| | | |
|---|---|---|
| 3,290,922 | 12/1966 | Thompson .......................... 73/52 |
| 3,435,664 | 4/1969 | Harris . |
| 3,438,493 | 4/1969 | Goble . |
| 3,608,715 | 9/1971 | Snyder et al. . |
| 3,691,521 | 9/1972 | Schaefer . |
| 3,745,384 | 7/1973 | Blanchard . |
| 3,771,121 | 11/1973 | Lohr . |
| 3,774,150 | 11/1973 | Matsui et al. . |
| 3,781,788 | 12/1973 | Schiesterl . |
| 3,802,252 | 4/1974 | Hayward et al. . |
| 3,810,655 | 5/1974 | Prachar . |
| 3,942,381 | 3/1976 | Brown et al. . |
| 4,049,935 | 9/1977 | Gruber . |
| 4,187,718 | 2/1980 | Shibasaki . |
| 4,212,205 | 7/1980 | West et al. . |
| 4,399,514 | 8/1983 | Hamasaki et al. . |
| 4,406,157 | 9/1983 | Miyahara et al. . |
| 4,600,855 | 7/1986 | Strachan . |
| 4,869,097 | 9/1989 | Tittman et al. .......................... 73/52 |
| 5,060,974 | 10/1991 | Hamilton et al. . |
| 5,351,527 | 10/1994 | Blackburn et al. .......................... 73/52 |

FOREIGN PATENT DOCUMENTS

| | | |
|---|---|---|
| 0600491 | 6/1994 | European Pat. Off. . |
| 2114742 | 8/1983 | United Kingdom . |

Primary Examiner—Richard Chilcot
Assistant Examiner—William L. Oen
Attorney, Agent, or Firm—Tarolli, Sundheim, Covell, Tummino & Szabo

[57] ABSTRACT

An apparatus (20) for sensing pressure in a stiff wall sealed vessel (30) comprises a piezoelectric transducer (200) operatively coupled to the vessel (30) for transferring energy to pressurized fluid in the vessel (30). A piezoelectric sensor (202) is operatively coupled to the vessel (30) for providing a received electrical signal having a frequency value indicative of the oscillation frequency of the pressurized fluid. A receiver circuit (224, 226, 228) is operatively connected to the sensor (202) and provides a fluid resonating signal having a frequency indicative of the fluid pressure in the vessel (30). A drive circuit (230) is operatively connected to the receiver circuit (224, 226, 228) and to the piezoelectric transducer (200). The drive circuit (230) initially drives the piezoelectric transducer (206) with noise. Subsequently, the drive circuit (230) drives the piezoelectric transducer (200) with an energy wave having a frequency equal to a frequency value functionally related to the natural frequency of the pressurized fluid in the vessel (30).

43 Claims, 5 Drawing Sheets

METHOD AND APPARATUS FOR TESTING FLUID PRESSURE IN A SEALED VESSEL

CROSS-REFERENCE TO RELATED APPLICATION

This is a continuation-in-part of U.S. patent application Ser. No. 986,035, filed Dec. 4, 1992, in the name of Blackburn, et al., for "Method and Apparatus for Testing Fluid Pressure in a Sealed Vessel" and assigned to TRW Vehicle Safety Systems Inc, now U.S. Pat. No. 5,351,527.

TECHNICAL FIELD

The present invention is directed to diagnostic testing of an occupant restraint system and is particularly directed to a method and apparatus for testing the fluid pressure in a sealed vessel from which pressurized fluid is released to fill an air bag of an occupant restraint system upon the occurrence of a vehicle crash condition.

BACKGROUND OF THE INVENTION

Vehicle occupant restraint systems having an actuatable restraining device are well known in the art. One particular type of actuatable restraining device includes an inflatable air bag mounted to inflate within the occupant compartment of the vehicle. The air bag has an associated, electrically actuatable ignitor, referred to as a squib.

Such occupant restraint systems further include a crash sensor for sensing the occurrence of a vehicle crash condition and for providing an electrical signal indicative of the crash condition. When the crash sensor indicates that the vehicle is in a crash condition, an electric current of sufficient magnitude and duration is passed through the squib for the purpose of igniting the squib. The squib, when ignited, ignites a combustible gas generating composition and/or pierces a vessel of pressurized gas operatively coupled to the air bag, which results in inflation of the air bag.

Pressurized gas vessels for use in occupant restraint systems are pressurized to approximately 2000–3000 PSI. Proper inflation of the air bag upon the occurrence of a vehicle crash condition is dependent on the pressurized vessel being at the proper pressure. Since the pressurized vessel will be installed in the vehicle at the time of manufacture and several years may pass prior to that vehicle being involved in a crash condition, a leak in the vessel may leave the vessel with insufficient pressure to inflate the air bag properly during its deployment. It would be useful, therefore, to provide a diagnostic test arrangement that monitors the fluid pressure in the vessel and warns the vehicle operator when the pressure in the vessel falls below a predetermined minimum value necessary for proper inflation of the air bag.

Several different methods and apparatus have been proposed to measure the pressure within the air bag pressure vessel and to warn the vehicle operator if the pressure falls below a predetermined value. These arrangements typically require that a pressure sensing device have access to the interior of the vessel through an associated test opening in the vessel. The test opening in the vessel, which is sealed after providing access to the pressure sensing device, is separate from the normally sealed air bag opening which is pierced upon firing of the squib and through which fluid flows to the air bag. If a pressurized vessel leaks, the location of such a leak is most probably at an opening in the vessel that was supposed to be sealed. Such leaks may develop simply due to a failure of the seal. Therefore, the more sealed openings that are present in the vessel, the greater the probability that a leak will develop. A pressure sensing method and apparatus that does not require an associated opening in the vessel avoids an additional potential leak path of pressurized gas from the vessel.

SUMMARY OF THE INVENTION

The present invention provides a method and apparatus for measuring the fluid pressure in a sealed vessel. The invention has particular application for diagnostic testing of a pressurized fluid vessel of an air bag restraint system. In accordance with the invention, a piezoelectric transducer adjacent the vessel outputs an initial noise signal to the vessel, a receiver monitors the fluid vibrations, and a monitoring circuit monitors for a frequency functionally related to the natural frequency of the fluid and subsequently drives the piezoelectric transducer at the frequency functionally related to the natural frequency of the fluid.

In accordance with one aspect of the present invention, an apparatus is provided for sensing pressure in a sealed vessel. The apparatus comprises a piezoelectric transducer assembly operatively coupled to the vessel for, when energized, transferring energy to pressurized fluid in the vessel. The energy transferred establishes oscillations of the pressurized fluid in the vessel. A piezoelectric receiver assembly is operatively coupled to the vessel for providing a received electrical signal having a frequency value indicative of the oscillation frequency of the pressurized fluid in the vessel. Receiver circuit means is operatively connected to the piezoelectric receiver assembly for providing a fluid resonating signal having a frequency value functionally related to the natural frequency of the oscillating pressurized fluid in the vessel. The frequency value functionally related to natural frequency is indicative of the fluid pressure in the vessel. The apparatus further includes drive circuit means operatively connected to the receiver circuit means circuit means and to the piezoelectric transducer assembly for initially driving the piezoelectric transducer assembly with a noise signal. Subsequently, the drive circuit means drives the piezoelectric transducer assembly with an energy wave having a frequency value functionally related to the natural frequency of the pressurized fluid in the vessel.

In accordance with another aspect of the present invention, a method is provided for sensing pressure in a sealed vessel. The method comprises the step of providing a piezoelectric transducer for transferring energy to pressurized fluid in the vessel. The energy establishes oscillations of the pressurized fluid in the vessel. The method also includes the step of providing a piezoelectric transducer for receiving a signal from the vessel having a frequency value functionally related to the natural frequency of the fluid in the vessel. Another step of the method is providing a fluid resonating signal having a frequency equal to the frequency value functionally related to the natural frequency of the oscillating pressurized fluid in the vessel. The frequency value functionally related to the natural frequency is indicative of the fluid pressure in the vessel. The method further includes initially and subsequently providing an oscillating energy wave to the vessel through the piezoelectric transducer, the oscillating energy having a frequency equal to the frequency value functionally related to the natural frequency of the pressurized fluid in the vessel.

In accordance with yet another aspect of the present invention, an air bag diagnostic apparatus is provided for use in an air bag restraint system. The air bag restraint system includes a crash sensor connected to a controller for providing a signal upon the occurrence of a vehicle crash condition. The restraint system also includes a pressurized fluid bottle, a squib connected to the fluid bottle and electrically connected to the controller, and an air bag connected to the fluid bottle. The controller actuates the squib upon the occurrence of a crash condition to open the fluid bottle and let the pressurized fluid in the bottle inflate the air bag. The air bag diagnostic apparatus comprises a piezoelectric transducer assembly operatively coupled to said fluid bottle for, when energized, transferring energy to pressurized fluid in the fluid bottle. The transferred energy establishes oscillations of the pressurized fluid in the fluid bottle. A piezoelectric receiver assembly is operatively coupled to the fluid bottle for providing a received electrical signal having a frequency value indicative of the oscillation frequency of the pressurized fluid in the vessel. Receiver circuit means is operatively connected to the piezoelectric receiver assembly for providing a fluid resonating signal having a frequency value functionally related to the natural frequency of the oscillating pressurized fluid in the fluid bottle. The frequency value functionally related to the natural frequency is indicative of the fluid pressure in the fluid bottle. The apparatus further includes drive circuit means operatively connected to the receiver circuit means and to the piezoelectric transducer assembly for initially driving the piezoelectric transducer assembly with a noise signal. Subsequently, the drive circuit means drives the piezoelectric transducer assembly with an oscillating energy wave having a frequency value functionally related to the natural frequency of the pressurized fluid in the fluid bottle. Monitoring means is provided for monitoring the frequency value functionally related to the natural frequency of the fluid in the gas bottle and for determining the fluid pressure of the fluid in the fluid bottle in response to the sensed frequency value functionally related to the natural frequency. The apparatus further includes means for providing an indication if the determined fluid pressure in the fluid bottle is less than a predetermined value.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which.

DESCRIPTION OF PREFERRED EMBODIMENTS

Figure 1:
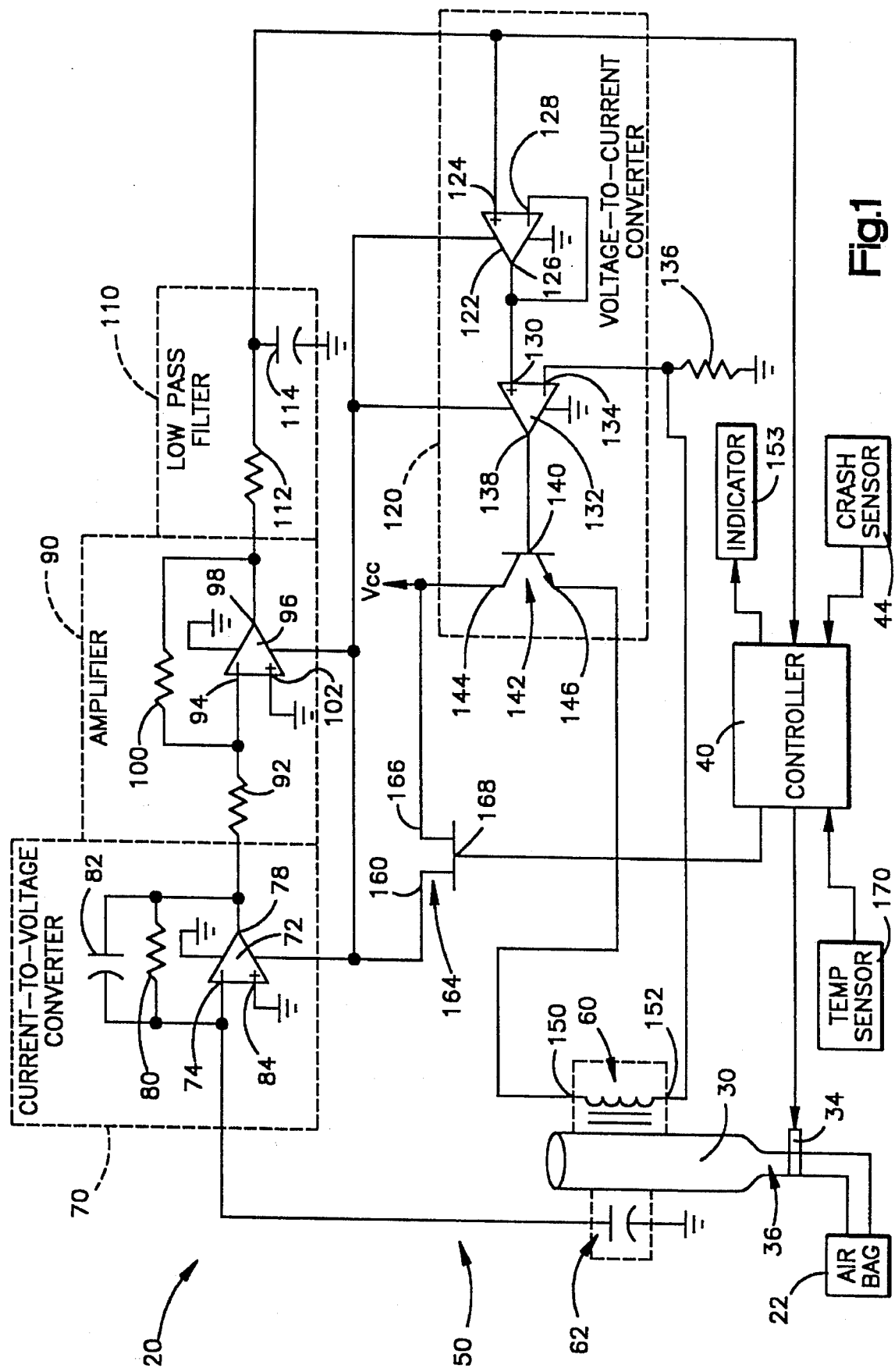
FIG. 1 is a schematic block diagram of an air bag restraint system including a diagnostic arrangement made in accordance with the present invention.

Referring to FIG. 1, an air bag restraint system 20, shown and described in copending patent application Ser. No. 986,035, includes an air bag 22 mounted in an appropriate location, such as the steering wheel for the driver or the instrument panel or dashboard for a passenger, so that it will inflate into the vehicle interior compartment. A sealed stiff walled vessel 30 contains pressurized fluid and is connected to the air bag 22. A squib 34 is operatively connected to the sealed opening 36 of the vessel 30. When the squib 34 is ignited, the seal in the opening of the vessel is opened or ruptured. When the seal of the vessel is opened, the pressurized fluid, which may be an inert gas such as nitrogen or argon, in the vessel 30 passes into and inflates the air bag 22.

The squib 34 is connected to a controller 40 such as a microcomputer. The controller 40 is connected to a vehicle crash sensor 44. The crash sensor 44 can be any of several known types. For example, the crash sensor 44 may be a mechanical inertia switch, such as a rolamite sensor, or an electrical accelerometer. If a normally open mechanical inertia switch is used, the electrical contacts are normally open during a non-crash condition. If a crash condition occurs, the normally open contacts close. Therefore, closure of the switch contacts is indicative of the occurrence of a vehicle crash condition.

If an electrical accelerometer is used as the crash sensor 44, there are several known algorithms or crash metrics for determining if a crash condition is occurring in response to the accelerometer output signal. One method is to compare the integrated accelerometer signal (i.e., crash velocity) against a predetermined value. If the value of the integrated accelerometer signal reaches the predetermined value or remains at or above the predetermined value for a predetermined time, this is an indication that a crash condition is occurring. Once the controller 40 determines that a vehicle crash is occurring for which deployment of the air bag is necessary to protect a vehicle occupant, the controller 40 ignites the squib 34.

A diagnostic circuit 50 is operatively connected to the vessel 30 and to the controller 40. The diagnostic circuit 50 determines the natural frequency of the gas in the vessel 30. The natural frequency of the gas in the vessel 30 is functionally related to the pressure of the gas in the vessel.

In accordance with one embodiment, a speaker 60 is operatively connected to the vessel 30. The speaker is a coil and magnet system that drives a thin flat stainless steel diaphragm. The lines of flux are directed through the center of the coil and pass through the stainless steel diaphragm. The steel diaphragm moves in response to the magnetic field of the coil. The diaphragm thickness is preferably 1 millimeter. The coils are preferably made of 32 awg wire with approximately 250 turns with a DC resistance of 150 Ohms. Energy produced by the speaker 60 is transferred to the pressurized fluid or gas in the vessel 30.

A piezoelectric capacitive sensor 62 is operatively connected to the vessel 30. The sensor 62 picks up the vibrations of the pressurized fluid in the vessel with the charge across the capacitive sensor changing as a function of the detected vibrations. Although polyvinylidene difluoride may be used as a piezoelectric material for the sensor 62, its low mechanical coupling coefficient makes other arrangements more desirable. Preferably, in accordance with this one embodiment, piezoelectric material, such as zirconate-titanate or zinc oxide, is sputtered in a thin film onto a bulk sheet of stainless steel diaphragm material. The sensor electrodes are preferably sputtered aluminum. Polyimide is applied as a protective passivation layer.

The sensor 62 is electrically connected to a current-to-voltage converter 70 for the conversion of the electrical current output from the capacitive sensor 62 into a voltage signal. The current-to-voltage converter 70 includes an operational amplifier ("op amp") 72 having its inverting input 74 connected to the sensor 62. The output 78 of op amp 72 is connected to the inverting input 74 through a parallel combination of a feedback resistor 80 and capacitor 82. A non-inverting input 84 of the op amp 72 is connected to electrical ground.

The component values for capacitor 82 and the resistor 80 are selected to give a desired phase shift. Preferably, the values are selected to provide a phase shift of +45 degrees.

The output of the current-to-voltage converter 70 is connected to an amplifier circuit 90. The amplifier circuit 90 includes a serial input resistor 92 that connects the output of the current-to-voltage converter 70 to the inverting input 94 of an op amp 96. The output 98 of the op amp 96 is connected to its inverting input 94 through a feedback resistor 100. The non-inverting input 102 of the op amp 96 is connected to electrical ground. The values of the resistors 92 and 100 are selected so that the gain of the amplifier 90 is greater than one. Because the amplifier 90 provides an inverting gain, the signal from the current-to-voltage converter is phase shifted by 180 degrees by amplifier 90.

The output of the amplifier 90 is connected to a low pass filter 110. The purpose for the low pass filter 110 is to remove harmonics of the pressure resonant or natural frequency of the pressurized fluid as well as frequencies that may be present as a result of vibrations of the vessel 30 itself. Any of several types of low pass filters may be used such as Butterworth, Chebychev, Bessel, or Elliptic. A simple RC filter may be used, as shown in FIG. 1. Such an RC filter includes a resistor 112 and a capacitor 114. The output of the low pass filter 110 is present at the junction of resistor 112 and capacitor 114. The output signal of the low pass filter has a frequency value equal to the natural frequency of the pressurized fluid in the vessel 30, which, in turn, is functionally related to the pressure of the fluid. The low pass filter 110 provides an additional 180 degree phase shift in the signal output from the amplifier 90.

The output of the low pass filter circuit 110 is connected to a voltage-to-current converter 120. The voltage-to-current converter 120 includes a first op amp 122 having its non-inverting input 124 connected to the output of the low pass filter 110. The output 126 of the op amp 122 is connected to its inverting input 128. The output 126 of the op amp 122 is also connected to the non-inverting input 130 of an op amp 132. The inverting input 134 of the op amp 132 is connected to electrical ground through a resistor 136. The output 138 of the op amp 132 is controllably connected to the base 140 of a transistor 142. The cathode 144 of the transistor 142 is connected to a voltage source Vcc. The electrode 146 of the transistor 142 is connected to a first terminal 150 of the speaker 60. A second terminal 152 of the speaker 60 is connected to the junction of the resistor 136 and the inverting input 134 of the op amp 132. Because the voltage-to-current converter 120 is non-inverting, there is no phase shift between its input and output. The value of resistor 136 controls the power supplied to the speaker.

The output of the low pass filter 110 is also connected to the controller 40. The controller 40 monitors the frequency of the output signal from the low pass filter 110. The controller 40 also uses an internal look-up table to determine the pressure of the fluid in the vessel 30 from the frequency value. If the pressure falls below a predetermined minimum value at any time during operation of the vehicle, the controller 40 actuates a warning indicator 153 which is mounted in the vehicle interior. The actuated indicator 153 informs the vehicle operator that a problem exists in the air bag system, i.e., the fluid pressure in the vessel 30 is too low.

Each of the op amps 72, 96, 122, and 132 has its associated power connection terminal connected to one terminal 160 of a solid state switching device 164 such as a field-effect-transistor ("FET"). A second terminal 166 of the FET 164 is connected to the voltage source Vcc. The controller 40 is controllably connected to the switch control input 168 of the FET 164. After the vehicle ignition is first started, the controller switches the FET 164 ON, thereby connecting Vcc to each of the op amps 72, 96, 122, and 132. When power is first applied to the op amps, a single square wave pulse in the form of a rising edge of electrical noise is output to the speaker coil 60. Those skilled in the art will appreciate that a square wave comprises the sum of all frequency components. Therefore, all frequency values are present in the initial application of a single square wave pulse. When the square wave pulse "hits" the vessel, the pressurized gas inside of the vessel will ring at its natural frequency, which is functionally related to the pressure of the fluid.

The circuit loop comprising the sensor 62, the current-to-voltage converter 70, the amplifier 90, the low pass filter 110, the voltage-to-current converter 120, and the speaker 60, which form a phase lock circuit having loop feedback, initially has a phase shift of +45 degrees. If a natural frequency exists in the pressurized fluid when the speaker 60 is initially pulsed with a square wave noise signal, the natural frequency pulls the loop phase shift down to a value of 0. At resonance, there is a phase shift between the speaker 60 and the receiver 62 of −45 degrees. Once the phase shift of the loop reaches the 0 value, the loop locks on to that frequency because the two conditions of loop oscillation are satisfied, i.e., a phase shift of 0 degrees and a gain greater than one. The natural frequency of the fluid as detected by the loop is monitored at the output from the low pass filter 110. This frequency is, through the feed-back circuit, used to drive the speaker 60 and continues to drive the speaker 60 at the natural frequency for a predetermined time period as determined by controller 40. Those skilled in that art will appreciate that the circuit arrangement may be left on continuously or can operate for a predetermined time after vehicle ignition ON.

The natural frequency of the compressed gas in the vessel 30 is the mechanical equivalent of an electrical oscillation. The only difference between the two is that the mechanical oscillation cannot be sustained at the same amplitude from cycle to cycle due to a finite amount of viscous damping in the system. However, the electrical loop of the present invention amplifies and phase shifts the natural frequency (brings the loop to 0 phase shift), thereby to sustain the oscillations.

Figure 2:
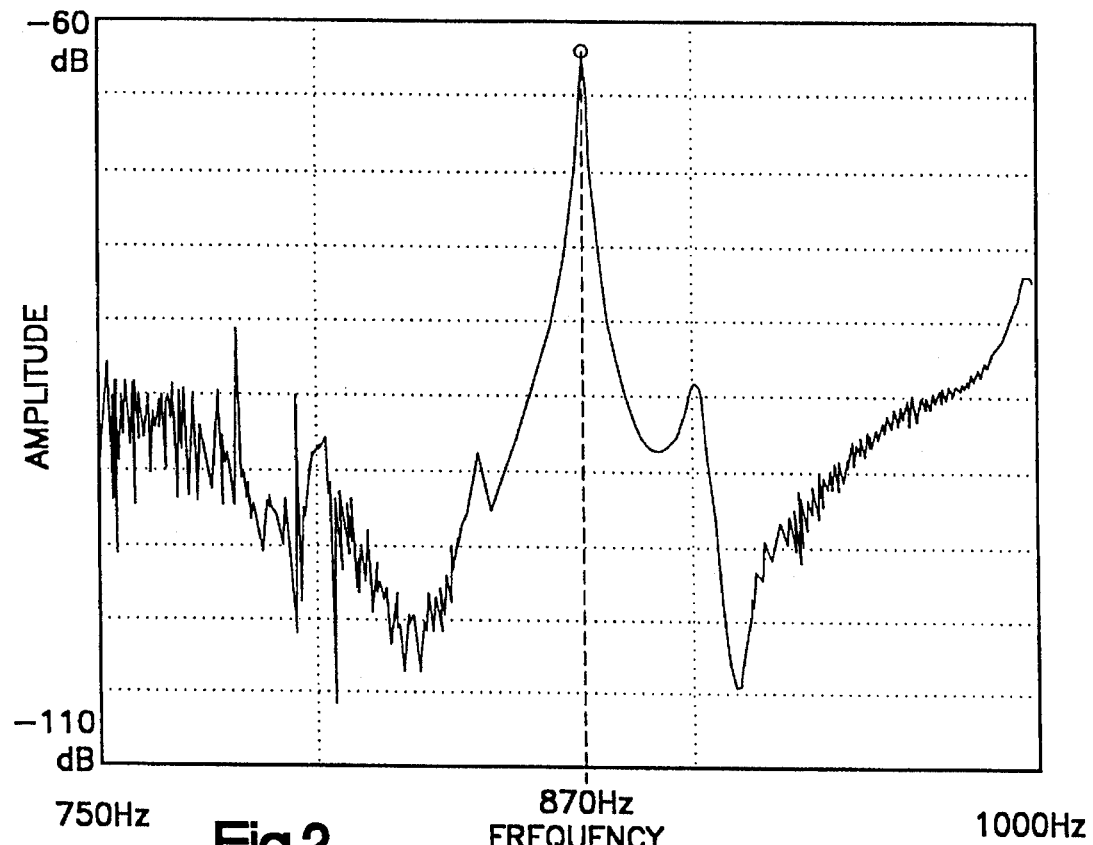
FIG. 2 is a graphical representation of the amplitude output of the monitored oscillations from the vessel shown in FIG. 1 as a function of a sweep frequency applied to the speaker.

A better understanding of the natural frequency of the fluid in the vessel can be appreciated from the graph shown in FIG. 2. In this graph, the magnitude of the signal from the sensor 62 is on the Y-axis and frequency is on the X-axis. To develop this graph, the speaker 60 is driven by an oscillator (not shown) that sweeps through a frequency range from 750 Hz to 1000 Hz. The drive signal for the speaker is a fixed amplitude signal. The graph represents data from a pressurized vessel having an inert noble gas at 2000 PSI. As can be seen from the graph, the magnitude of the oscillations seen by the sensor is greatest at approximately 870 Hz. The amplitude peak in the transfer function at 870 Hz is due to the very small damping coefficient in the first gas column mode, which has a natural frequency of 870 Hz at this temperature and pressure.

If this pressurized vessel was monitored by the control loop of the present invention, the loop would lock onto the 870 Hz frequency. The initial square wave pulse from the speaker has all frequencies present, including 870 Hz. The initial application of the square wave pulse would result in the sensor detecting the oscillation of greatest amplitude, i.e., the 870 Hz frequency. The loop satisfies the two conditions need for oscillation at the natural frequency of the gas, i.e., a gain greater than one and a zero phase shift.

Figure 3:
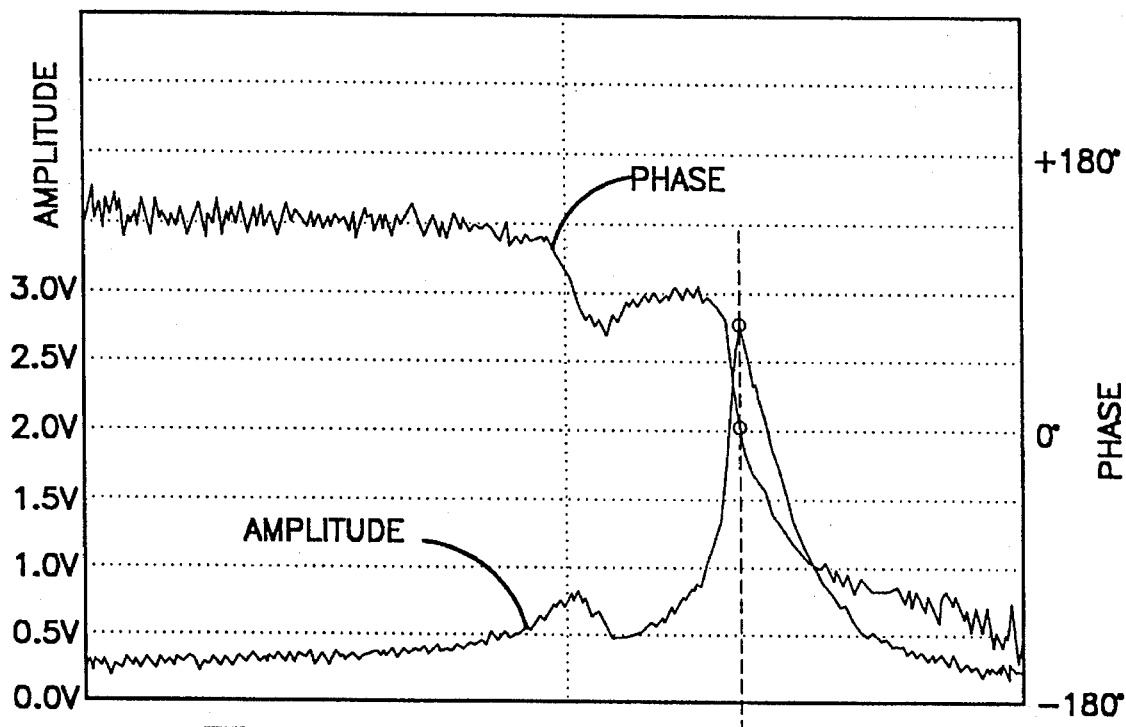
FIG. 3 is an overlaid graphical representation of (i) relative phase versus input frequency and (ii) signal amplitude versus input frequency for the system shown in FIG. 1.

Referring to FIG. 3, a phase versus frequency graph is superimposed upon an amplitude versus frequency graph. Frequency is on the X-axis. The Y-axis has both a phase designation and an amplitude designation. The phase values of the phase graph represent the value of the signal output from the low pass filter 110 divided by the value of the input signal to the speaker 60. The frequency at which the peak amplitude occurs and at which the zero phase occurs is the natural frequency of the pressurized gas in the vessel. Rather than sweeping through a frequency range, "hitting" the vessel with the initial square wave energy pulse which includes all of the frequencies results in the natural frequency being picked up by the sensor 62 and the frequency being locked-on by the circuit loop.

Figure 4:
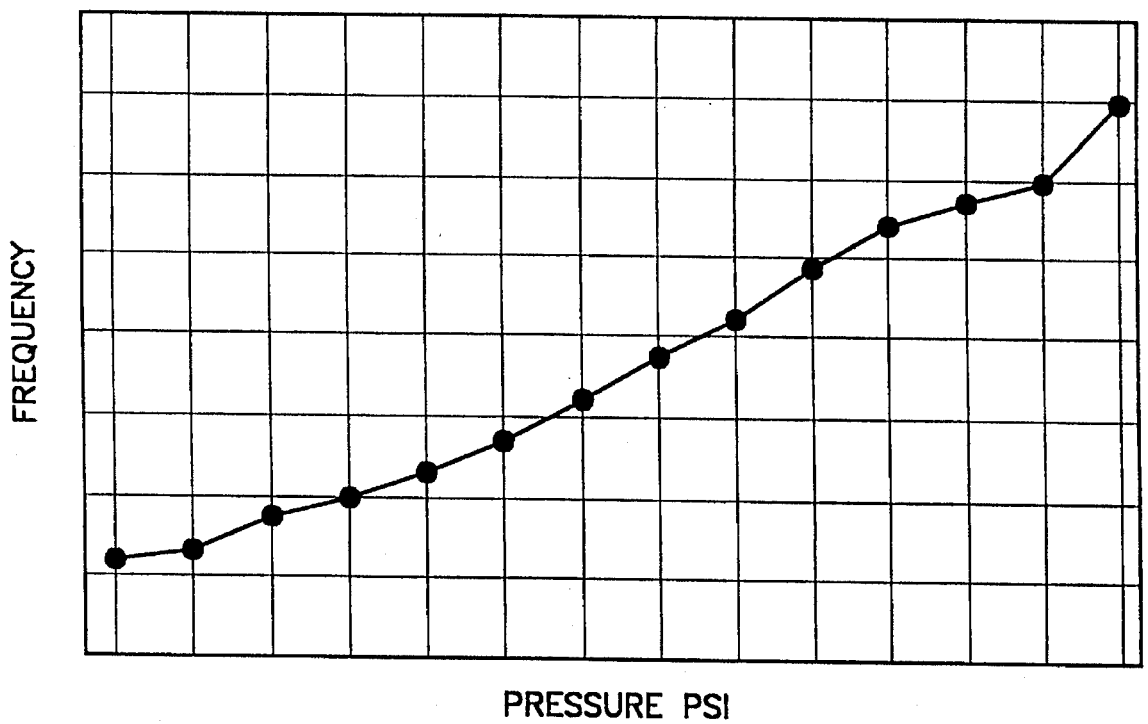
FIG. 4 is a graphical representation of natural frequency versus pressure for the system shown in FIG. 1.

FIG. 4 is a natural frequency versus pressure graph with frequency on the Y-axis and pressure in PSI on the X-axis. This graph shows the functional relationship between frequency and pressure for an inert noble gas.

Figure 5:
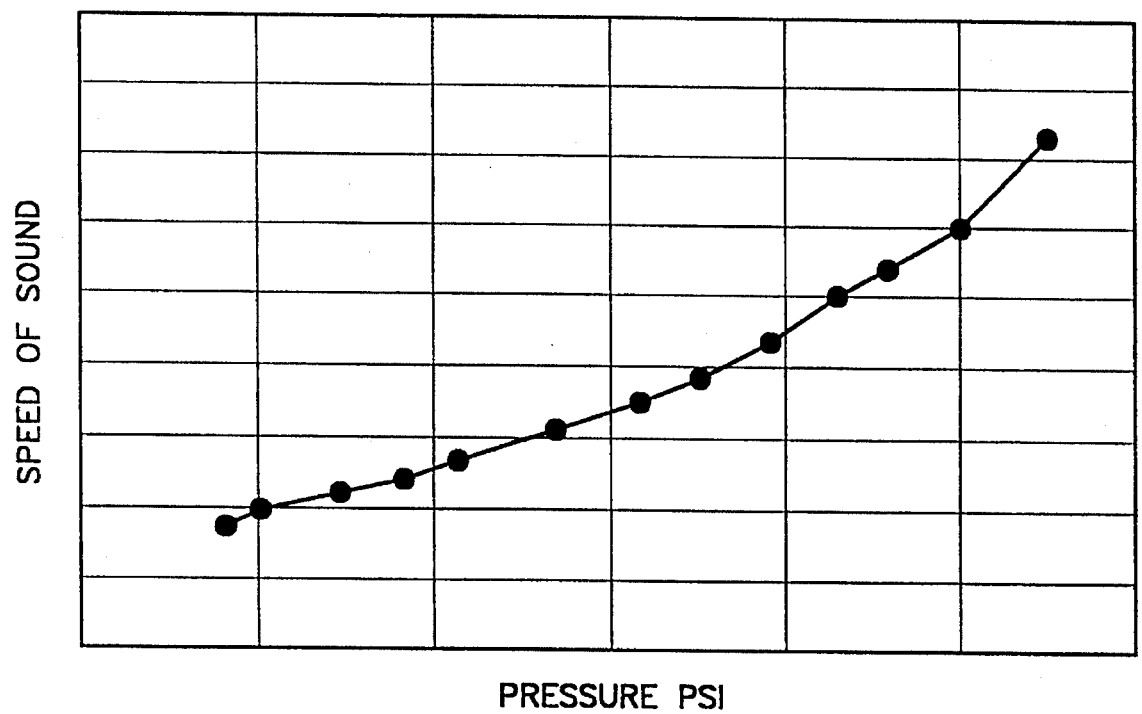
FIG. 5 is a graphical representation of the speed of sound of the fluid versus pressure for the system shown in FIG. 1.

FIG. 5 is a speed of sound in the pressurized fluid versus pressure graph with the speed of sound on the Y-axis and pressure in PSI on the X-axis. This graph is also for an inert noble gas. As can be seen by the graph, the speed of sound in the gas increases as the pressure of the gas increases. The circuit loop of the present invention exploits this phenomena by locking onto the natural frequency of the pressurized gas in the vessel due to the gas resonating in the vessel.

The natural frequency of the gas in the vessel is governed by a second order system assuming lumped parameters. Using a basic spring-mass model, the laws of motion may be expressed as:

$$m \cdot \frac{d^2 \cdot X}{dt^2} + c \cdot \frac{d \cdot X}{dt} + k \cdot X = F(t) \quad (1)$$

where X=displacement of mass, dX/dt=first derivative of mass displacement, $d^2X/dt^2$=second derivative of mass displacement, m=mass, c=damping coefficient, and k=spring constant. By taking the Laplace transform of Equation (1), and introducing the complex frequency term s=jω, Equation (1) becomes:

$$s^2 + \frac{c}{m} \cdot s + \frac{k}{m} = \frac{F(s)}{m} \quad (2)$$

The roots of the characteristic equation above are derived via the quadratic formula:

$$s_1 \cdot s_2 = -\frac{c}{2 \cdot m} \pm \sqrt{\left(\frac{c}{2 \cdot m}\right)^2 - \frac{k}{m}} \quad (3)$$

In an attempt to reduce Equation (2) to standard form, the radical of Equation (3), which is the critical damping term, is set equal to 0:

$$\left(\frac{c}{2 \cdot m}\right)^2 - \frac{k}{m} = 0 \quad (4)$$

By letting the damping coefficient for critical damping be:

$$c_{crit} = 2 \cdot \sqrt{k \cdot m} \quad (5)$$

The damping ratio is defined as:

$$\zeta = \frac{c}{c_{crit}} = \frac{c}{2 \cdot \sqrt{k \cdot m}} \quad (6)$$

The natural frequency is defined as:

$$\omega_n = \sqrt{\frac{k}{m}} \quad (7)$$

The quality factor is defined as:

$$Q = \frac{\omega_n \cdot m}{c} = \frac{1}{2} \cdot \zeta \quad (8)$$

Equation (2) can then be rewritten as:

$$s_1 \cdot s_2 = -\zeta \cdot \omega_n \pm \omega_n \cdot \sqrt{\zeta^2 - 1} \quad (9)$$

The gas oscillations, when driven at resonance will be amplified by the factor Q=½ζ, where ζ is the viscous damping ratio in the gas. The damped resonant frequency of the gas may be expressed as:

$$\omega_d = \omega \cdot \sqrt{(1 - \zeta^2)} \quad (10)$$

and is very near the undamped frequency expressed as:

$$\omega = 2 \cdot \pi \cdot f \quad (11)$$

when damping is low. For the gas confined in a pressure vessel, the measured Q factors are extremely high, e.g., 2,000 or more. Thus, damping of acoustic modes in a pressure vessel is very low, with viscous damping ratios as low as 0.025% of critical. This low damping facilitates operation of oscillatory pressure sensor. Therefore, the measured frequency will be virtually identical with the natural frequency of the gas' acoustic mode.

A temperature sensor 170 is connected to the controller 40. In accordance with the well known "Ideal Gas Law," the pressure of the gas in the vessel 30 increases with an increase in the temperature of the gas. Since the ambient temperature affects the temperature of the gas in the vessel 30, it is necessary to monitor the gas temperature and to adjust the determination of the gas pressure as a function of the sensed temperature. The controller 40 measures the frequency output from the low pass filter 110 and adjusts the measurement based upon the monitored temperature. The temperature sensor 170 can either monitor the ambient temperature or can be secured to the vessel to measure the vessel temperature more accurately. The temperature of the gas is functionally related to the temperature of the vessel which is, in turn, functionally related to the ambient temperature about the vessel.

Figure 6:
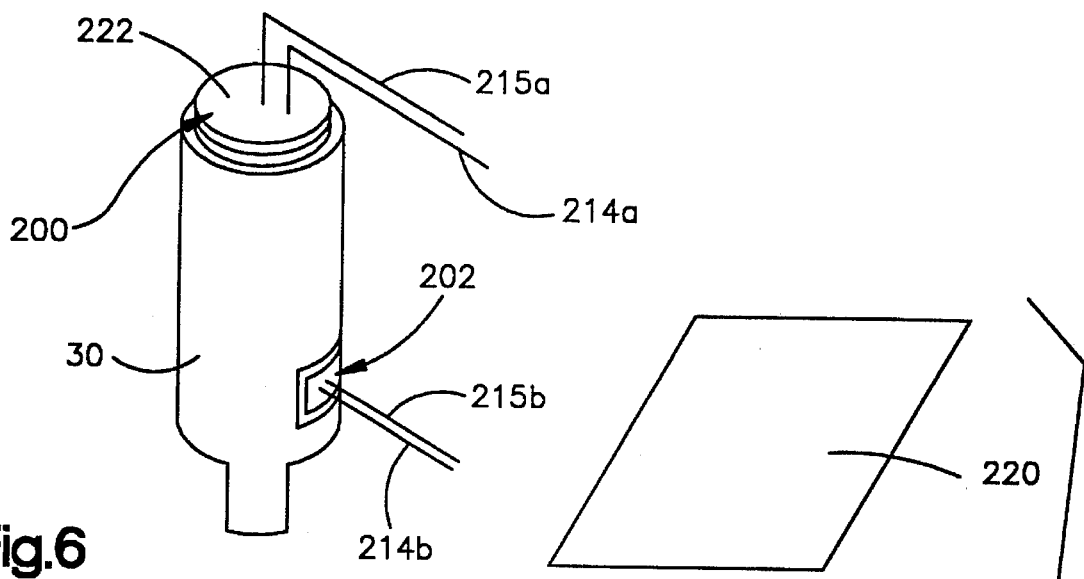
FIG. 6 is a schematic diagram showing an alternative embodiment of the present invention.

FIGS. 6–10 show a preferred embodiment of the present invention. Referring to FIG. 6, a piezoelectric transducer actuator patch assembly 200 is operatively secured to vessel 30, preferably at an end wall 222. A piezoelectric transducer sensor patch assembly 202 is also operatively coupled to the vessel 30, preferably at a side wall location.

Actuator patch assembly 200 and sensor patch assembly 202 are identically structured capacitive piezoelectric transducers. Therefore, only the structure of the transducer assembly 200 is described in detail, it being understood that the receiver assembly is identically structured.

Figure 7:
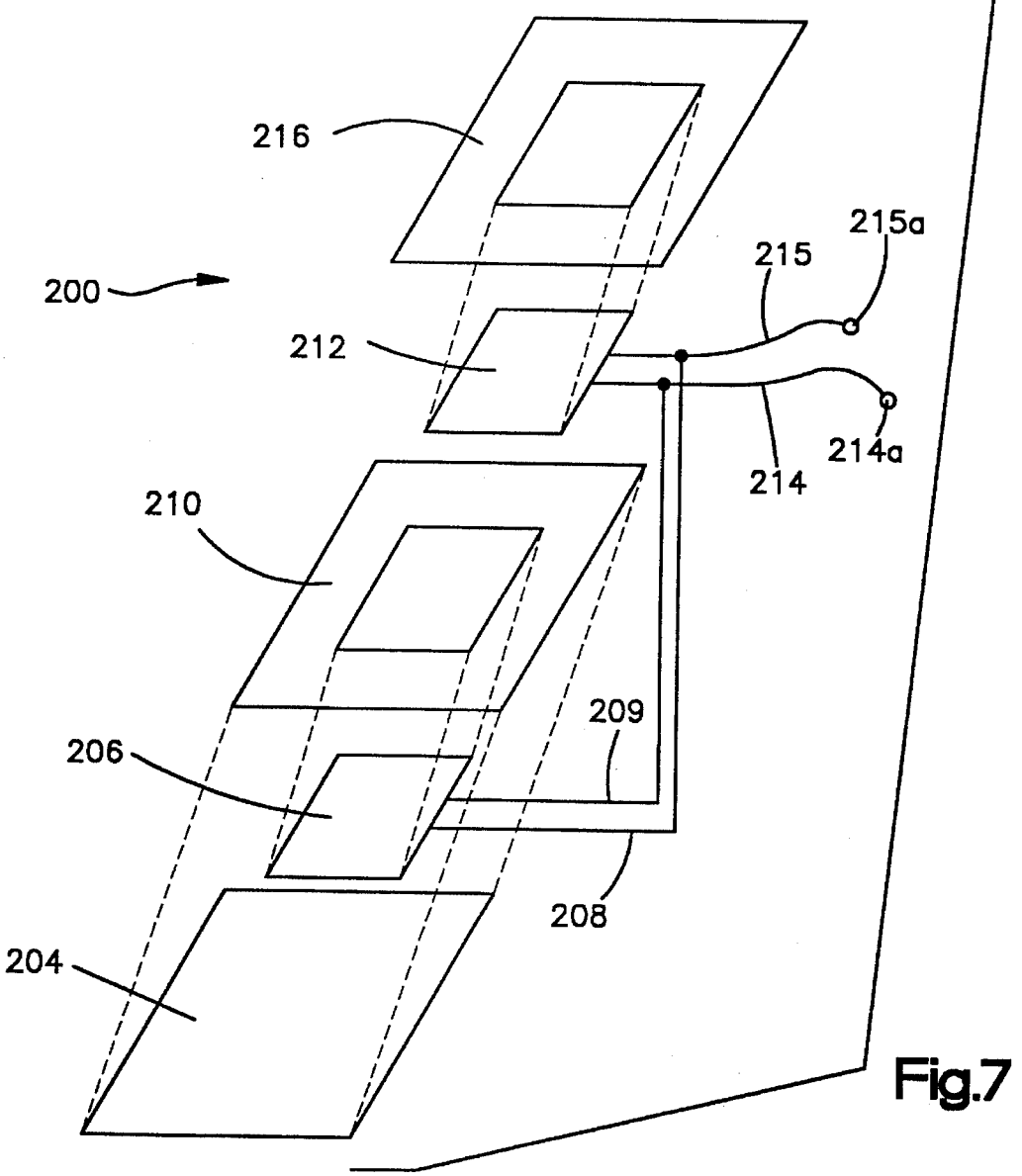
FIG. 7 is a schematic diagram of a piezoelectric transducer patch assembly for use with the present invention.

Referring to FIG. 7, patch assembly 200 includes a plurality of layers secured together so as to function as a piezoelectric transducer. A first layer 204 is referred to as a base encapsulation layer. Layer 204 is secured to vessel 30 using an appropriate adhesive or by being clamped to the vessel. Since the patch assembly 200 is thin and relatively flexible, the patch assembly conforms to the shape of the vessel 30. A first piezoceramic element layer 206 is secured to base layer 204. Piezoceramic element layer 206 includes a first terminal 208, and a second terminal 209. Adjacent to piezoceramic element layer 206 is first spacing layer 210 that has a central opening with dimensions similar to those of piezoceramic element layer 206. A second piezoceramic element layer 212, having a first terminal 214 and a second terminal 215, is placed against the first spacing layer 210. The piezoceramic layers 206, 212 are preferably made with lead zirconate-titanate ("PZT"). A second spacing layer 216, that has a central opening with dimensions similar to second piezoceramic element layer 212 is positioned adjacent to piezoceramic element layer 212. A second encapsulation layer 220 is secured to second spacing layer 216.

The first and second piezoceramic elements 206 and 212 are both transducer actuator elements when patch assembly 200 is used as an actuator. Both piezoceramic elements 206, 212 are transducer sensor elements when patch assembly 200 is used as a sensor. Terminals 208 and 215 are connected to each other. Terminal 215 provides an external electrical connection to a ground reference. Terminals 209 and 214 are connected to each other. Terminal 214 provides an electrical connection to either (i) a charge amplifier if the patch assembly is used as a sensor transducer 202 or, (ii) a voltage amplifier if the patch assembly is used as an actuator transducer 200. This patch assembly provides a transducer and receiver that has small size and power requirements, excellent linearity, and an excellent signal-to-noise ratio.

Figure 8:
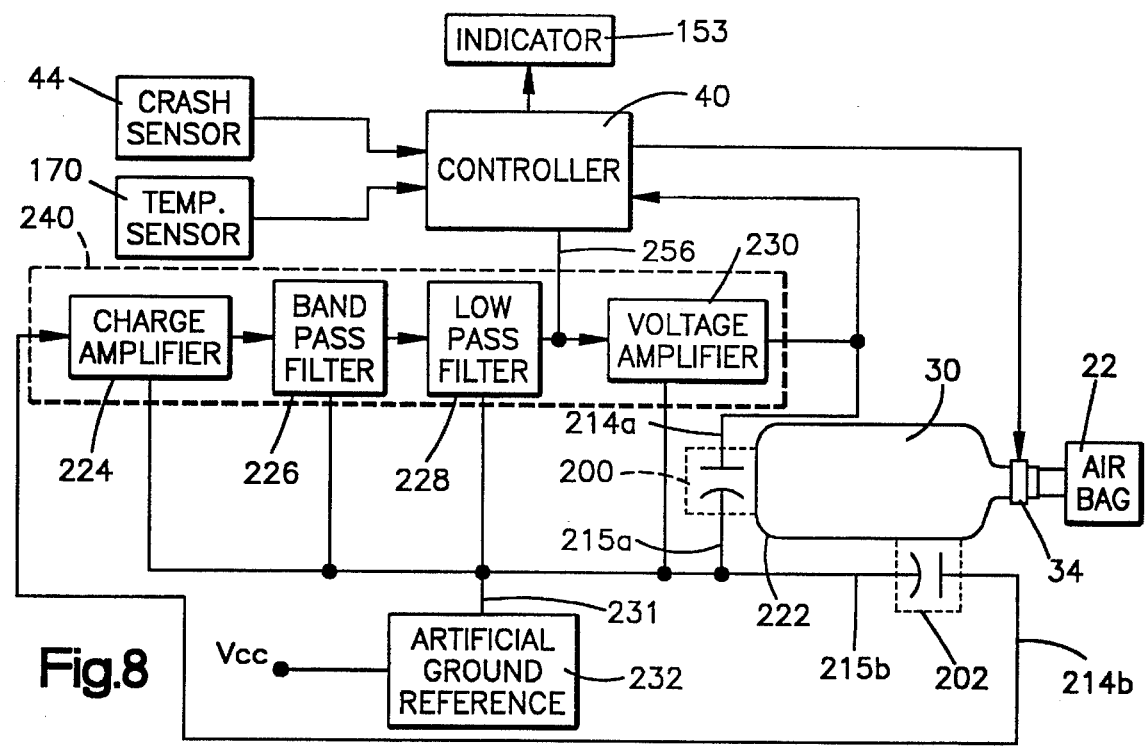
FIG. 8 is a schematic block diagram of an air bag restraint system including a diagnostic arrangement made in accordance with a preferred embodiment of the present invention.

Referring to FIG. 8, a circuit arrangement using the preferred patch technology is shown. Elements having similar functions with elements of FIG. 1 are given common numbers and are not described in detail. Piezoelectric actuator patch assembly 200, having a terminal 214a and a terminal 215a, is operatively connected to vessel 30 on bottom wall 222. A positive voltage applied through terminal 214a to actuator patch assembly 200 moves the bottom wall 222 to transfer energy to the pressurized fluid or gas so as to create a longitudinal acoustic wave in vessel 30.

Piezoelectric sensor patch assembly 202, having terminals 214b and 215b, is operatively connected to the side wall of vessel 30. Sensor 202 detects deformations in vessel 30 due to the acoustic wave introduced into the gas within the vessel by actuator 200. A charge across sensor elements of sensor 202 changes as a function of the vessel deformations when the acoustic wave is reflected in the vessel.

Sensor 202 is electrically connected through terminal 214b to a charge amplifier 224. Charge amplifier 224 converts the charge provided by piezoelectric sensor 202 to a voltage signal. Examples of commercially available charge amplifiers are the Linear Technology LT1012, NSC-LM660, and Burr-Brown OPA 111.

Charge amplifier 224 provides the voltage signal to a two-pole band pass filter 226, the signal from which is then passed to a two-pole low pass filter 228. Together the band pass and low pass filters, 226 and 228, constitute the compensator. The compensator operates on signals that may be present as a result of vibrations of the vessel 30 itself. The compensator passes through frequencies in a selected range, applying an amplification and desired phase shift, so as to enhance the vibrations when fed back to the actuator, while attenuating signals outside the desired frequency range. Other forms of compensator besides a band pass-low pass filter combination may be envisaged, although this compensator has been found to perform particularly well, while maintaining a simple implementation.

Figure 9:
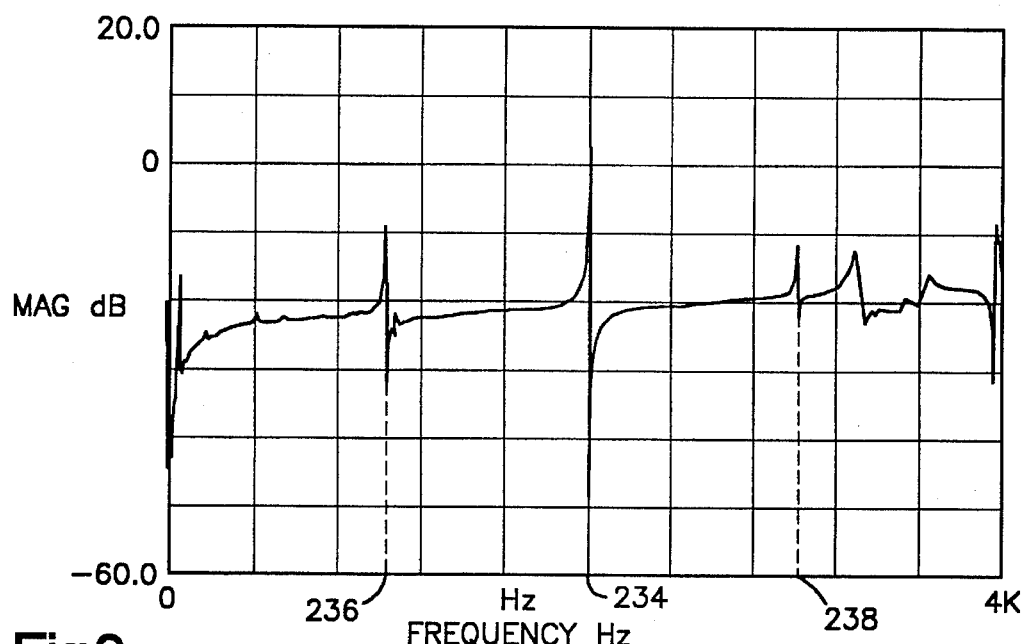
FIG. 9 is a graphical representation of the frequency response for the system of FIG. 8.

FIG. 9 shows a graphical representation of the frequency response for a plant (the system being controlled) transfer function, from a signal driving the voltage amplifier, through the pressure vessel dynamics, to the voltage signal from the charge amplifier. This plant transfer function indicates three longitudinal acoustic modes. The second acoustic mode 234 has a significant amplitude, with gain greater than 1 (0 dB), so that it represents a good target frequency to be included within the bandwidth passed by the band pass-low pass compensator, 226 and 228. A first mode 236 and a third mode 238 have less significant amplitudes and represent frequencies to be removed by the compensator 226 and 228. One skilled in the art will appreciate that the cutoff frequencies of the compensator 226 and 228 may be designed so as to pass any selected harmonics present within a window between the frequencies of the band pass and low pass filters. Other forms of compensators may perform a similar function. For instance, a two-pole low pass filter with a dynamic amplification, or Q factor, greater than one can be tuned to the selected target acoustic mode frequency range. The high Q low pass filter will provide the desired signal amplification near the filter frequency along with a $-90°$ phase shift. The plant provides an additional $-90°$ phase shift at the acoustic mode resonance. Thus total phase shift is $-180°$ which can result in loop instability when fed back negatively if the magnitude of the acoustic resonance is sufficiently high.

The output of low pass filter 228 is connected to a voltage amplifier 230. Voltage amplifier 230 amplifies the voltage signal from low pass filter 228 and drives piezoelectric actuator patch assembly 200. The output of voltage amplifier 230 is connected to actuator patch assembly 200 at terminal 214a and connected to controller 40.

Each of the amplifiers 224, 230, the filters 226, 228 and the piezoelectric patch assemblies 200, 202 has its associated neutral (i.e., ground) connection terminal connected to terminal 231 of an artificial ground reference 232. Input voltage $V_{cc}$ is a 5 v single sided supply. Charge amplifier 224, band pass filter 226, low pass filter 228, and amplifier 230 include operational amplifiers which typically require a plus and minus power supply. Since vehicle electrical systems are powered from a battery, i.e., a single sided supply, an artificial ground at a predetermined relatively positive value must be established. The output voltage of artificial ground 232 is 2.5 v. This arrangement makes $V_{cc}$ and ground appear as plus 2.5 v and minus 2.5 volt lines, respectively.

When power is first applied to the vehicle system, i.e., the vehicle is first started, random electrical noise is present within the circuit represented in FIG. 8. Those skilled in the art will appreciate that a random electrical noise signal embraces a wide range of frequencies and has a randomly varying instantaneous amplitude starting with a rising edge. The electrical noise signal is "picked up" by actuator patch assembly 200 through terminal 214*a*. Actuator patch assembly 200 transfers the initial noise signal to the pressurized gas inside vessel 30 by deforming bottom wall 222 so as to start a longitudinal acoustic wave toward the other end of the vessel. The pressurized gas inside the vessel will ring at its natural and harmonic frequencies as illustrated in FIG. 9 and described above. Sensor patch assembly 202 detects the resultant deformations in pressure vessel 30 when the acoustic wave is reflected from the opposite end.

The oscillator circuit 240, including charge amplifier 224, band pass filter 226, low pass filter 228, and voltage amplifier 230, have amplitude and phase characteristics so as to overcome the natural damping in the gas and to lock onto a frequency within the predetermined frequency bandwidth.

Figure 10:
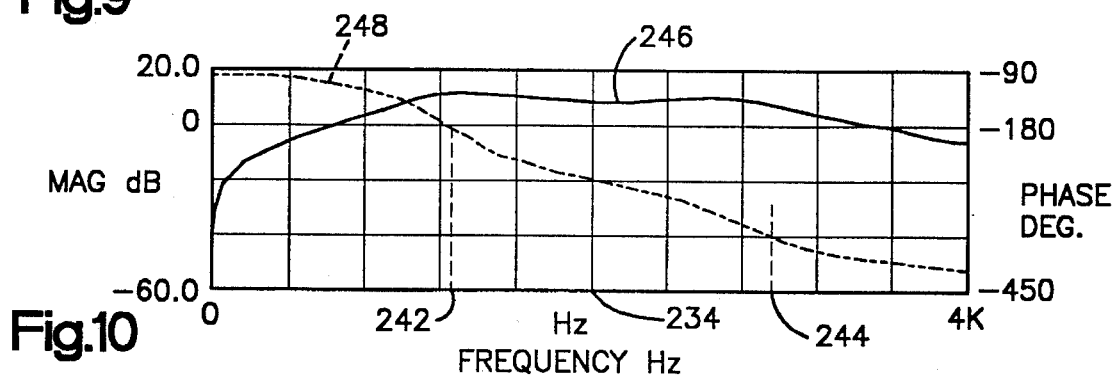
FIG. 10 is a Bode plot for the system shown in FIG. 8.

FIG. 10 is a Bode plot for the band pass-low pass filter compensator circuit 226 and 228 of FIG. 8. The compensator gain magnitude plot 246 is seen to have a relatively constant magnitude of approximately 10 dB near the frequency of the expected acoustic mode resonance 234. The gain magnitude is seen to decrease at frequencies below the lower cutoff frequency 242, and at frequencies above the upper cutoff frequency 244. The pass band is between frequencies 242 and 244. The frequencies of the first and third acoustic harmonics 236 and 238, which are not intended to be excited, are seen to fall outside the passband.

The compensator phase response plot 248 is also shown in FIG. 10. The compensator phase varies from −180° at the lower cutoff frequency 242° to −360° at the upper cutoff frequency 244. The compensator phase shift near the second acoustic resonance 234 is seen to be near −270°. This, together with the additional −90° phase shift of the second acoustic resonance, provides the necessary phase condition for instability of −360° (or 0°) when positive feedback is applied. The magnitude of the second acoustic mode 234 is greater than 0 dB and the magnitude of the compensator gain 246 is approximately 10 dB. Thus, the magnitude or gain of the loop is greater than 10 dB, and oscillation is assured when the loop is closed. The response magnitude of the oscillation will grow and achieve steady state when a current or voltage limitation in one of the electronic components is reached. Typically response is limited by supply voltage to the voltage amplifier 230. For moderate variations in the second acoustic mode resonant frequency, the conditions for instability will be maintained and oscillation will still occur. The circuit thus assures that an oscillation of the second acoustic mode will occur as the acoustic mode frequency 234 varies due to pressure changes. The first and third acoustic modes 236 and 238 are outside the gain bandwidth of the compensator and are thus gain stabilized. The first and third acoustic modes are also phase stabilized by the compensator. Thus the oscillator circuit succeeds in making the second acoustic mode oscillate as pressure varies, while other acoustic modes are suppressed.

The output signal of oscillator circuit 240 is provided to controller 40. Controller 40 monitors that the frequency of the output signal is within a predetermined range. When the monitored frequency is within a predetermined range, the gas pressure in vessel 30 is within range.

A signal is provided to indicator 153 from controller 40 indicating whether the frequency of the output signal from oscillator circuit 240 is within the predetermined range. Indicator 153 may indicate a pass/fail condition or indicate the actual measured pressure of the gas contained in the vessel.

Oscillator circuit 240 oscillates the fluid in vessel 30 for a period of time sufficient for controller 40 to determine the frequency of the output signal of oscillator circuit 240. Once the frequency is determined, controller 40 terminates the oscillations in oscillator circuit 240 through connection 256 which pulls the output of low pass filter "LOW".

This invention has been described with reference to preferred embodiments. Modifications and alterations may occur to others upon reading and understanding this specification. For example, the indicator 153, rather than being visible to the vehicle operator, could be part of a vehicle diagnostic system that is queried electronically by a vehicle mechanic when servicing the vehicle. In addition, although described for use in a vehicle air bag system, the present invention is applicable to measuring pressure of fluids or gasses within any vessel. For example, scuba tanks, fire extinguishers, industrial gas production and transportation, gas welding, and any systems using compressed gases to inflate objects such as life rafts and preservers.

Even though the present invention has been described for use in a vehicle, it is not limited to such an application and may be used on a production line to test gas pressure in an air bag gas source vessel prior to installation or shipping.

It is our intention to include all such modifications and alterations insofar as they come within the scope of the appended claims and the equivalents thereof.

Having fully described the invention, the following is claimed:

1. An apparatus for sensing pressure in a sealed vessel, said apparatus comprising:

a piezoelectric patch transducer assembly operatively secured to said vessel for, when energized, transferring energy to pressurized fluid in said vessel through a localized deformation of the vessel, said transferred energy establishing oscillations of the pressurized fluid in the vessel;

a piezoelectric patch receiver assembly operatively secured to said vessel for providing a received electrical signal having a frequency value functionally related to the natural frequency of the pressurized fluid in said vessel;

receiver circuit means operatively connected to said receiver assembly for providing a fluid resonating signal having a frequency value functionally related to the natural frequency of the oscillating pressurized fluid in the vessel, the frequency value functionally related to the natural frequency being indicative of the fluid pressure in said vessel; and drive circuit means operatively connected to said receiver circuit means and to said piezoelectric patch transducer assembly for initially driving said piezoelectric patch transducer assembly with a noise signal and subsequently driving said piezoelectric patch transducer assembly with an oscillating energy wave having a frequency equal to said frequency value functionally related to the natural frequency of said pressurized fluid in said vessel.

2. The apparatus of claim 1 wherein said receiver circuit means includes filtering means for filtering said received electrical signal to remove frequency components that result from oscillations of the vessel itself, said fluid resonating signal being output from said filtering means so that the frequency of said fluid resonating signal is due only to the pressurized fluid in the vessel.

3. The apparatus of claim 2 wherein said filtering means includes a low-pass filter.

4. The apparatus of claim 3 wherein said filtering means includes a band pass filter.

5. The apparatus of claim 2 wherein said piezoelectric patch receiver assembly further includes a capacitive piezoelectric patch sensor that outputs an electrical charge signal.

6. The apparatus of claim 5 wherein said receiver circuit means further includes a charge amplifier connected to said sensor for converting said charge signal from said piezoelectric patch receiver assembly into a voltage signal.

7. The apparatus of claim 6 wherein said frequency value functionally related to the natural frequency is a harmonic of the natural frequency.

8. The apparatus of claim 6 further including monitoring means for monitoring the frequency value functionally related to the natural frequency of the fluid in said vessel and for determining the fluid pressure of the fluid in the vessel in response to the sensed frequency value functionally related to the natural frequency and means for providing an indication if the determined fluid pressure is less than a predetermined value.

9. The apparatus of claim 8 further including a temperature sensing means connected to monitoring means for providing a signal to said monitoring means indicative of the ambient temperature around said vessel, said monitoring means adjusting the indication of the fluid pressure in said vessel in response to the sensed temperature.

10. The apparatus of claim 1 wherein said frequency value functionally related to the natural frequency of the gas is a harmonic of the natural frequency.

11. The apparatus of claim 1 further including monitoring means for monitoring the frequency value functionally related to the natural frequency of the fluid axis. in said vessel and for determining the fluid pressure of the fluid in the vessel in response to the sensed frequency value functionally related to the natural frequency and means for providing an indication if the determined fluid pressure is less than a predetermined value.

12. The apparatus of claim 1 wherein said piezoelectric patch transducer assembly is a modular piezoelectric ceramic, two layer, back-to-back, actuator made from lead zirconate titanate ("PZT").

13. The apparatus of claim 1 wherein said piezoelectric patch transducer assembly, said piezoelectric patch receiver assembly, said receiver circuit means, and said drive circuit means form a closed control loop, said closed control loop including means for providing a loop gain and phase shift upon the occurrence of a frequency value functionally related to the natural frequency of the pressurized fluid so that said closed control loop locks onto said frequency value functionally related to the natural frequency.

14. The apparatus of claim 13 wherein said frequency value functionally related to the natural frequency is a harmonic of the natural frequency.

15. An air bag diagnostic apparatus for use in an air bag restraint system including a crash sensor connected to a controller for providing a signal upon the occurrence of a vehicle crash condition, a pressurized fluid bottle, a squib connected to the fluid bottle and electrically connected to the controller, and an air bag connected to the fluid bottle, the controller actuating the squib upon the occurrence of a crash condition to open the fluid bottle and let the pressurized fluid in the bottle inflate the air bag, the diagnostic apparatus comprising:

a piezoelectric patch transducer assembly operatively secured to said fluid bottle for, when energized, transferring energy to pressurized fluid in said fluid bottle through a localized deformation of the bottle, said energy establishing oscillations of the pressurized fluid in the fluid bottle;

a piezoelectric patch receiver assembly operatively secured to said fluid bottle for providing a received electrical signal having a frequency value indicative of the oscillation frequency of the pressurized fluid in said fluid bottle;

receiver circuit means operatively connected to said piezoelectric patch receiver assembly for providing a fluid resonating signal having a frequency indicative of a frequency value functionally related to the natural frequency of the oscillating pressurized fluid in the fluid bottle, the frequency value functionally related to the natural frequency being indicative of the fluid pressure in said fluid bottle;

drive circuit means operatively connected to said receiver circuit means and to said piezoelectric patch transducer assembly for initially driving said piezoelectric patch transducer assembly with a noise signal and subsequently driving said piezoelectric patch transducer assembly with an oscillating energy wave having a frequency equal to said frequency value functionally related to the natural frequency of said pressurized fluid in said fluid bottle;

monitoring means for monitoring the frequency value functionally related to the natural frequency of the fluid in said fluid bottle and determining the fluid pressure of the fluid in the fluid bottle in response to the sensed frequency value functionally related to the natural frequency; and means for providing an indication if the determined fluid pressure in the fluid bottle is less than a predetermined value.

16. The apparatus of claim 15 wherein said frequency value functionally related to the natural frequency is a harmonic of the natural frequency.

17. The apparatus of claim 15 further including a temperature sensing means connected to said monitoring means for providing a signal to said monitoring means indicative of the ambient temperature around said vessel, said monitoring means adjusting the indication of the fluid pressure in said fluid bottle in response to the sensed temperature.

18. The apparatus of claim 15 wherein said receiver circuit means includes filtering means for filtering said received electrical signal to remove frequency components that result from oscillations of the fluid bottle itself, said fluid resonating signal being output from said filtering means so that the frequency of said fluid resonating signal is due only to the pressurized fluid in the fluid bottle.

19. The apparatus of claim 18 wherein said filtering means includes a low-pass filter.

20. The apparatus of claim 19 wherein said filtering means includes a band pass filter.

21. The apparatus of claim 18 wherein said piezoelectric patch receiver assembly further includes a capacitive piezoelectric patch sensor that outputs an electrical charge signal.

22. The apparatus of claim 21 wherein said receiver circuit means further includes a charge amplifier connected to said sensor for converting said charge signal from said sensor into a voltage signal.

23. The apparatus of claim 22 wherein said filtering means includes a low-pass filter.

24. The apparatus of claim 23 wherein said filtering means includes a band pass filter.

25. The apparatus of claim 15 wherein said piezoelectric patch transducer means is a modular piezoelectric ceramic, two layer, back-to-back, actuator manufactured from lead zirconate titanate ("PZT").

26. The apparatus of claim 25 wherein said piezoelectric patch transducer assembly, said piezoelectric patch receiver assembly, said receiver circuit means, and said drive circuit means form a closed control loop, said closed control loop including means for providing a loop gain and a phase shift upon the occurrence of a frequency value functionally related to the natural frequency of the pressurized fluid so that said closed control loop locks onto said frequency value functionally related to the natural frequency.

27. An apparatus for sensing pressure in a sealed vessel, said apparatus comprising:

a piezoelectric patch transducer assembly operatively secured to said vessel for, when energized, transferring a noise signal to pressurized fluid in said vessel through a localized deformation of the vessel, said noise signal establishing oscillations of the pressurized fluid in the vessel including a frequency value equal to a frequency value functionally related to the natural frequency of the pressurized fluid;

a piezoelectric patch receiver assembly operatively secured to said vessel for providing a received electrical signal having a frequency value indicative of a frequency value functionally related to the natural frequency of the pressurized fluid in said vessel; and receiver circuit means operatively connected to said piezoelectric patch receiver assembly for providing a fluid resonating signal having a frequency equal to the frequency value functionally related to the natural frequency of the oscillating pressurized fluid in the vessel, the frequency value functionally related to the natural frequency being indicative of the fluid pressure in said vessel, said receiver circuit means including filtering means connected to said piezoelectric patch receiver assembly for removing frequency components from said received electrical signal that result from oscillations of the vessel itself.

28. The apparatus of claim 27 wherein said frequency value functionally related to the natural frequency is a harmonic of the natural frequency.

29. A method for sensing pressure in a vessel, said method comprising the steps of:

providing a piezoelectric patch transducer for transferring energy to pressurized fluid in the vessel through a localized deformation of the vessel, said transferred energy establishing oscillations of the pressurized fluid in the vessel;

providing a piezoelectric patch transducer for receiving a signal from the vessel having a frequency value indicative of an oscillation frequency of the pressurized fluid in said vessel including a frequency value functionally related to the natural frequency of the pressurized fluid in said vessel;

providing a fluid resonating signal to said piezoelectric patch transducer, said signal having a frequency value functionally related to the natural frequency of the oscillating pressurized fluid in the vessel, the frequency value functionally related to the natural frequency being indicative of the fluid pressure in said vessel;

initially providing a noise signal to said vessel; and subsequently providing an oscillating energy wave having a frequency equal to said frequency value functionally related to the natural frequency of said pressurized fluid in the vessel.

30. The method of claim 29 wherein said step of providing a fluid resonating signal having a frequency value functionally related to the natural frequency includes providing a harmonic of the natural frequency.

31. The method of claim 29 further including the step of filtering the received electrical signal to remove frequency components that result from oscillations of the vessel itself so that the frequency of said fluid resonating signal is due only to the pressurized fluid in the vessel.

32. The method of claim 31 wherein said step of filtering includes passing frequency components less than a predetermined value.

33. The method of claim 32 wherein said step of filtering includes passing frequency components within a predetermined bandwidth.

34. The method of claim 31 wherein said step of receiving includes providing a capacitive piezoelectric sensor that outputs an electrical charge signal.

35. The method of claim 34 wherein said step of receiving further includes providing a charge amplifier circuit connected to said sensor for converting said charge signal from said sensor into a voltage signal.

36. The method of claim 35 wherein said step of filtering means includes passing only frequency components having a value less than a predetermined value.

37. The method of claim 36 wherein said step of filtering means includes passing frequency components within a predetermined bandwidth.

38. A method for determining the functionality of an air bag restraint system including a crash sensor connected to a controller for providing a signal upon the occurrence of a vehicle crash condition, a pressurized fluid bottle, a squib connected to the fluid bottle and electrically connected to the controller, and an air bag connected to the fluid bottle, the controller actuating the squib upon the occurrence of a crash condition to open the fluid bottle and let the pressurized fluid in the bottle inflate the air bag, the method comprising the steps of:

transferring energy to pressurized fluid in said vessel through localized deformation of said vessel from a piezoelectric patch transducer assembly, said transferred energy establishing oscillations of the pressurized fluid in the fluid bottle;

providing a received electrical signal having a frequency value indicative of an oscillation frequency of the pressurized fluid in said fluid bottle including a frequency value functionally related to the natural frequency of the pressurized fluid in the vessel;

providing a fluid resonating signal having a frequency equal to a frequency value functionally related to the natural frequency of the oscillating pressurized fluid in the vessel, the frequency value functionally related to the natural frequency being indicative of the fluid pressure in said fluid bottle;

initially providing a noise signal to the fluid bottle;

subsequently providing an oscillating energy wave to the fluid bottle having a frequency equal to said frequency value functionally related to the natural frequency of said pressurized fluid in said fluid bottle;

monitoring the frequency value functionally related to the natural frequency of the fluid in said fluid bottle;

determining the fluid pressure of the fluid in the fluid bottle in response to the sensed frequency value functionally related to the natural frequency; and providing an indication if the determined fluid pressure in the fluid bottle is less than a predetermined value.

39. The method of claim 38 wherein said step of providing a fluid resonating signal having a frequency value functionally related to the natural frequency includes providing a harmonic of the natural frequency.

40. The method of claim 38 further including the steps of sensing the ambient temperature around the fluid bottle and adjusting the indication of the fluid pressure in said fluid bottle in response to the sensed temperature.

41. The method of claim 38 further including the step of filtering the received electrical signal to remove frequency components that result from oscillations of the fluid bottle itself so that the frequency of said fluid resonating signal is due only to the pressurized fluid in the fluid bottle.

42. A method for sensing pressure in a vessel, said method comprising the steps of:

providing a piezoelectric patch transducer assembly for transferring a noise signal to pressurized fluid in the vessel through a localized deformation of said vessel, said transferred noise signal establishing oscillations of the pressurized fluid in the vessel including a frequency value equal to a frequency value functionally related to the natural frequency of the pressurized fluid;

providing a piezoelectric patch receiver assembly for receiving a signal from the vessel having a frequency value indicative of an oscillation frequency of the pressurized fluid in said vessel including a frequency value functionally related to the natural frequency of the pressurized fluid in said vessel;

filtering the signal received from the vessel to remove frequency components that result from oscillations of the vessel itself; and providing a fluid resonating signal in response to the filtered received signal having a frequency equal to the frequency value functionally related to the natural frequency of the oscillating pressurized fluid in the vessel, the frequency value functionally related to the natural frequency being indicative of the fluid pressure in said vessel.

43. The method of claim 42 wherein said step of providing a fluid resonating signal having a frequency value functionally related to the natural frequency includes providing a harmonic of the natural frequency.

* * * * *

UNITED STATES PATENT AND TRADEMARK OFFICE
CERTIFICATE OF CORRECTION

PATENT NO.   : 5,591,900
DATED        : January 7, 1997
INVENTOR(S)  : Allen J. Bronowicki, Steven P. Kuritz, Brian K. Blackburn, Scott B. Gentry and Joseph F. Mazur It is certified that error appears in the above-indentified patent and that said Letters Patent is hereby corrected as shown below:

Column 13, line 27, after "fluid" delete --axis.--.

Signed and Sealed this

Eighth Day of July, 1997

Attest:

BRUCE LEHMAN

Attesting Officer

Commissioner of Patents and Trademarks